United States Patent [19]
Fisher

[11] Patent Number: 5,841,601
[45] Date of Patent: Nov. 24, 1998

[54] ELIMINATION OF INTER SYMBOL INTERFERENCE-INDUCED TIMING PHASE AND GAIN STEPS AT SECTOR START IN PRML DIGITAL MAGNETIC DATA STORAGE CHANNEL

[75] Inventor: Kevin D. Fisher, Palo Alto, Calif.

[73] Assignee: Quantum Corporation, Milpitas, Calif.

[21] Appl. No.: 756,731

[22] Filed: Nov. 26, 1996

Related U.S. Application Data

[62] Division of Ser. No. 600,015, Sep. 15, 1995, Pat. No. 5,600,502, which is a continuation of Ser. No. 222,908, Apr. 5, 1994, abandoned.

[51] Int. Cl.⁶ .................................................... G11B 5/09
[52] U.S. Cl. ................................ 360/48; 360/45; 360/51
[58] Field of Search ................................ 360/45, 46, 48, 360/78.04, 77.02, 51, 77.08; 370/342; 371/45, 37.5, 2.1, 47.1, 48; 341/100; 364/602, 724.19; 711/12

[56] References Cited

U.S. PATENT DOCUMENTS 5,493,454  2/1996  Ziperovich et al. ................... 360/46 X
5,673,259  9/1997  Quick ....................................... 370/342

Primary Examiner—Aristotelis M. Psitos
Assistant Examiner—Patrick Wamsley
Attorney, Agent, or Firm—David B. Harrison; Debra A. Chun

[57] ABSTRACT

A method is provided for elimination of periodic inter symbol interference (ISI) resulting in timing phase steps and channel amplitude control steps occurring following a periodic preamble pattern, such as a ¼T sine wave pattern and at the beginning of a random pattern user data field in a partial response, maximum likelihood digital magnetic data storage channel. The method comprises the steps of:

determining a periodicity of periodic ISI events in relation to main magnetic flux transitions during playback of a periodic signal waveform thereof, writing a new preamble field to the magnetic data storage channel of a periodic signal waveform preceding the user data field in which the phase of the periodic signal waveform is shifted, e.g. 180 degrees, at the determined periodicity of undershoot events, and locking a digital data sampling timing loop and a digital channel gain control circuit to the new preamble field, whereby undershoot-induced ISI timing phase steps and amplitude control steps at the preamble-to-user data field transition region are eliminated.

12 Claims, 4 Drawing Sheets

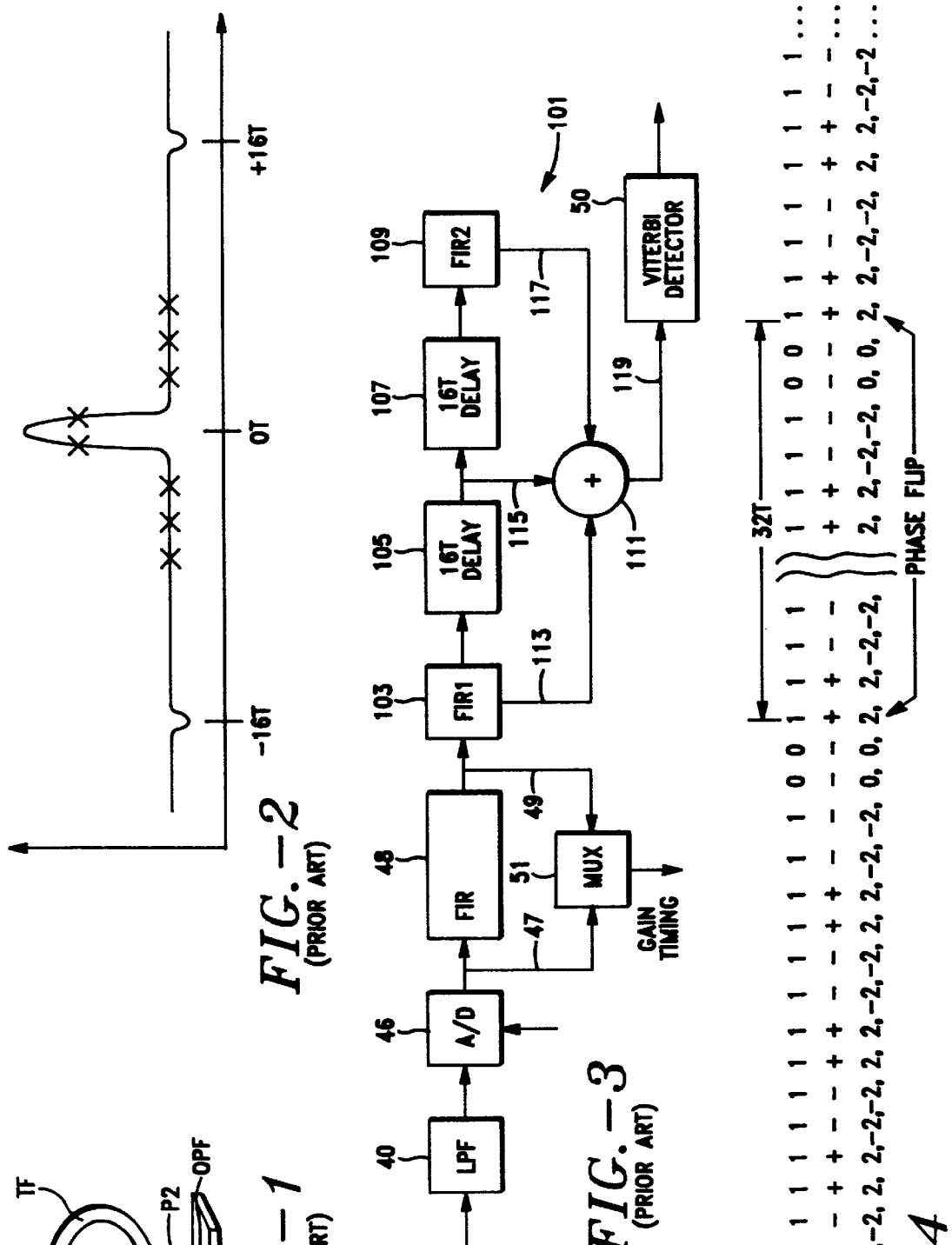

ELIMINATION OF INTER SYMBOL INTERFERENCE-INDUCED TIMING PHASE AND GAIN STEPS AT SECTOR START IN PRML DIGITAL MAGNETIC DATA STORAGE CHANNEL

This application is a division of 08/600,015, now U.S. Pat. No. 5,600,502, filed Sep. 15, 1995 which was a FWC of 08/222,908, filed Apr. 5, 1994, now abandoned.

FIELD OF THE INVENTION

The present invention relates to reduction of unwanted signal artifacts within a partial response, maximum likelihood ("PRML") digital magnetic data storage channel. More particularly, the present invention relates to elimination of inter symbol interference-induced timing phase and gain amplitude steps occurring at data sector start in a PRML digital magnetic data storage channel receiving any read signal with significant uncancelled inter symbol interference at the PLL phase detector and/or AGC gain control circuitry.

BACKGROUND OF THE INVENTION

Inter symbol interference ("ISI") is a term which is frequently employed to describe the behavior of magnetic recording systems. ISI may be due to one or more of a number of different causes. When magnetic transitions are placed in very close proximity, pulses may become crowded which changes the amplitudes of the pulses, and which shifts the peaks of the pulses. ISI may also be attributable to certain magnetic data transducer characteristics. One such characteristic, "undershoot", is most frequently associated with e.g. thin film heads. ISI sources may be associated with other head designs and structures, such as magneto-resistive read only/inductive write head structures, for example, which exhibit readback non-linearities.

Thin film heads are now frequently employed within high capacity, high performance digital data storage and retrieval channels, such as in PRML digital magnetic data storage devices. One drawback of e.g. thin film heads is that they typically introduce undershoot artifacts into the electrical signal stream during playback of data from a relatively moving magnetic medium, such as a data track of a magnetic disk M. FIG. 1 illustrates a thin film head element TF in which main field (MF) flux lines are mainly focused between inside edges of two poles P1 and P2 which defines the flux transition sensing field. However, because the thin film poles P1 and P2 have finite pole widths, they have outer polar fields (designated by a long flux path line OPF in FIG. 1). When a magnetic flux transition passes by an outer edge of a pole, e.g. PI in FIG. 1, a "pre-transition" bump or "undershoot" is induced in the head structure and manifests itself as an undesirable electrical amplitude spike or pulse US in the electrical output current from the head. The undershoot US may occur on one side, or maybe both sides, of each main flux transition recorded on the magnetic medium. The undershoots typically occur at some measurable time before and/or after the head senses the flux reversal within its primary sensing field, depending on several factors, such as pole tip width, and relative velocity between the magnetic medium and the head. Depending on these factors, the undershoot bump may occur somewhere in the range of 10–20 clock cycle intervals ("T cells"). FIG. 2 illustrates an undershoot occurring at −16T and another one occurring at +16T relative to a main transition occurring at 0T, for example. When a high frequency preamble or sync pattern is being read, the undershoots may line up and undesirably add to the high frequency pulses, leading to timing loop and gain loop convergence errors.

In theory, "infinite pole tip models" are frequently discussed. As the pole tip of the thin film head element gets wider, the bump amplitude becomes smaller, and its occurrence is farther away from the main pulse, as the outer polar field becomes longer and longer.

Referring to FIG. 2, when a signal is properly equalized within a partial response, class IV, system, the main pulse results in two adjacent unitary sample values, while adjacent sample values on each side of the main pulse are quantized at zero amplitude. These samples remain zero until the undershoot(s) is encountered. The absolute value of the undershoot may typically have a peak amplitude of about ten percent of the absolute value of the peak amplitude of the main pulse, as shown in FIG. 2.

The problems associated with undershoot are present everywhere within a PRML class IV digital data channel. Importantly, with regard to the present invention, these problems are most severe during a preamble field which is typically recorded as a frequency burst of constant amplitude sine waves. During playback of user data, a scrambler is employed which scrambles the impact of the undershoots, and they add into the recovered sample stream as an extra noise source. However, during preamble, a periodic pattern is purposefully chosen so that simultaneous optimization of orthogonal timing and AGC loops may be carried out. Since timing, gain and DC offset loops bear an orthogonal relationship to each other, they may be operating simultaneously and independently of each other in reaching optimization during the preamble field interval.

Thus, there are really two places where undershoot may cause problems in operation of a PRML digital sample data channel. One is during detection of actual user data bits, and another is during timing loop and gain control acquisition while the preamble field passes by the thin film head.

In order to eliminate this interference during detection of actual user data bits, it is practical to apply an undershoot cancellation filter, sometimes referred to as a "pole tip filter". One example of a pole tip filter is provided in FIG. 3. Before discussing FIG. 3, reference is made to copending, commonly assigned U.S. patent application Ser. No. 07/937,064 filed on Aug. 27, 1992 and entitled: "Disk Drive Using PRML Class IV Sampling Data Detection with Digital Adaptive Equalization", now U.S. Pat. No. 5,341,249, the disclosure thereof being incorporated herein by reference. That patent describes an exemplary PRML digital data channel having a second order timing loop and a first order gain loop, and structural elements associated therewith. Structural elements thereof which are essentially unchanged in the present discussion are assigned the same reference numerals in this discussion.

In FIG. 3, a pole tip filter 101 is interposed in a digital signal path between an adaptive finite impulse response ("FIR") filter 48 and a Viterbi detector 40. In this example, the pole tip filter 101 includes a first FIR filter 103, a first digital sample delay 103 having a predetermined length, such as e.g. 16T, a second digital sample delay 105 having a predetermined length, such as e.g. 16T, a second FIR filter 109 and a summing junction 111. The summing junction combines weighted values received respectively from the first FIR 103, a common node between the two delays 105 and 107 and from the second FIR filter 109 to provide a sum in which the undershoot attributed to the outer polar field of the thin film data transducer head TF is effectively canceled. One drawback of the pole tip filter 101 depicted in FIG. 3 is that at least a 32 T latency is required before filtering operation begins. This latency, attributable to the two 16T delays 105 and 107, means that an excessively long preamble field would have to be provided for timing phase lock, or possibly that the PLL becomes unstable or inaccurate in operation. Such a long preamble field would add excessive overhead to a disk drive, particularly one employing embedded servo sectors which necessitate timing resynchronization to user data following each embedded servo sector. For timing and gain loop acquisition, the process must be started and completed much sooner; therefore preliminary samples (taken before the undershoot filter as at e.g. multiplexer 51) are used.

In the case of a ¼T sine wave preamble pattern, unless eliminated or effectively canceled, the undershoots can add to the periodic sine wave pulses in a systematic and undesirable fashion because of the periodicity of the preamble pattern. The effect of additive undershoots during the repetitive preamble pattern is that timing phase can become skewed during timing PLL sync lock to the preamble pattern. This phase skew of the timing control loop can result in mis-sampling of coded transitions read back from the magnetic storage medium, leading to unacceptable bit error rates at the beginning of the user data field following the preamble field. A phase timing error of as much as five percent has been observed in practice, and this error or phase step in the timing loop has resulted in undue bit errors in as many as the first 10–20 user data bytes of the data field. For example, a phase step PS associated with undershoot-induced timing phase error representative of the prior art is superimposed as one graph upon similar graphs illustrating operation of the present invention in FIG. 6 hereof.

In addition to timing loop phase errors, the undershoot-induced ISI can lead to errors in convergence of the gain control loop. When the undershoots add to the ¼T sine wave peaks undesirably, the filtered digital samples taken from the output of the FIR filter 48 will erroneously manifest an incorrect magnitude, and this condition will be properly detected by the gain control circuit 64 and will result in reduction of overall channel gain. When the random user data field is reached and the effects of additive ISI are no longer present, the nominal channel gain will be determined to be too low, and an undesirable gain control step (identified by reference symbols GS in FIG. 6) will be present during the e.g. initial 10–20 bytes of user data. The undesired gain step GS can have an undesired additive effect to the undesired timing control loop phase step PS which further degrades data recovery, until both timing and gain control loops have readjusted to randomized user data.

One possible solution to the problem of the unwanted phase step is to inject a counter-step of proper inverse phase magnitude into the timing loop at the transition between preamble and user data, in order to cancel the effect of the undershoot-induced phase step. However, such an approach favors a digital synchronizer which is amenable to this proposed solution. Other forms of data synchronizers, such as analog synchronizers, are less amenable to injection of a phase step, because their electrical characteristics tend to change or drift with time or temperature. Also, precise undershoot and channel filter settings must be known typically on an individual channel basis in advance.

A gain step could also be inserted into the gain control loop 64, but only with added gain loop structural complexity and a priori information about the nature of the gain step of the particular data channel.

Thus, heretofore an unsolved need has remained for an effective method for eliminating undershoot-induced ISI timing phase steps and gain control loop steps and resultant data sampling errors occurring at the beginning of a user data field in a PRML digital sampling magnetic data storage and retrieval channel employing e.g. thin film data transducer heads.

SUMMARY OF THE INVENTION WITH OBJECTS

One object of the present invention is to provide a method and apparatus for eliminating periodic (e.g. undershoot-induced) ISI data sampling errors occurring at the beginning of a user data field within a PRML sampling data channel in a manner overcoming limitations and drawbacks of prior approaches.

Another object of the present invention is to modify a preamble pattern preceding a user data field in a manner in which unfavorable ISI, such as undershoot lineup, is eliminated, thereby eliminating ISI-induced timing phase and gain control steps and mis-sampling of user data for an interval at the beginning of a user data field.

A further object of the present invention is to change phase and gain of a ¼T sine wave pattern periodically in order to cancel the effect of ISI caused e.g. by undershoot lineup and to achieve a more optimized sampling phase and gain control at the start of random user data.

One more object of the present invention is to change the phase of a ¼T sine wave preamble pattern by periodically inserting zero values into an input of a $1/(1 \oplus D^2)$ precoder at intervals related to periodicity of ISI from e.g. undershoot lineup in the preamble pattern within a PRML Class IV sampling data detection channel.

Yet another object of the present invention is to provide a method for measuring undershoot of a data transducer head structure, such as a thin film head, during read back of a sine wave pattern to determine periodicity of undershoot-induced ISI events, and then phase shifting the sine wave pattern at the determined periodicity to cancel the effect of undershoot lineup and resultant timing loop phase shift and gain control amplitude offset in a digital sampling data detection channel.

A still further object of the present invention is to phase shift groups of sine waves of a preamble field at a rate corresponding to periodicity of ISI, such as undershoots, so that the distorting influence of undershoots will be balanced out and canceled over time.

Yet one more object of the present invention is to provide a method enabling quicker and more reliable timing loop phase lock and gain loop amplitude control in a data storage device, such as a hard disk drive, employing a PRML sampling data detection channel and undershoot-inducing data transducer heads, thereby reducing the length of timing preamble fields, and enabling a greater amount of user data to be stored on a rotating magnetic storage disk surface of the hard disk drive, thereby reducing overhead and cost per user bit of data stored.

In one aspect of the present invention, a method is provided for elimination of ISI-induced timing phase and channel gain steps at start of a user data field in a partial response, maximum likelihood digital magnetic data storage channel. The method comprises the steps of:

determining a periodicity of ISI events in relation to main magnetic flux transitions during playback of a periodic signal waveform thereof, writing a new preamble field to the magnetic data storage channel of a periodic signal waveform preceding the user data field in which the phase of the periodic signal waveform is altered at the determined periodicity of ISI events, and phase locking a digital data sampling timing loop to the new preamble field, whereby ISI-induced timing phase steps are eliminated.

In this method the step of altering the periodic signal waveform at the determined periodicity preferably comprises the step of shifting phase of the waveform by approximately 180 degrees.

Further, in this method the step of shifting phase of the waveform by approximately 180 degrees preferably comprises the step of inserting zeros into a digital data stream of ones leading into a $1/(1 \oplus D^2)$ precoder during writing of the new preamble field.

In another aspect of the present invention, a hard disk drive including a rotating data storage disk, a data transducer head for writing data to the disk and reading data from the disk and manifesting a measurable periodic ISI characteristic, a sequencer for sequencing user data blocks to and from the data storage surface, includes a digital write-mode channel for writing a partial response class IV signal to the disk. The write-mode channel comprises in series interconnection during a writing mode of the hard disk drive: the sequencer, an ENDEC/SERDES for encoding the data and for serializing encoded data into a serial data stream, a preamble insertion multiplexer for inserting a stream of preamble-producing data values into the serial data stream in lieu of serial data from the ENDEC/SERDES, a precoder for preceding the serial data stream in accordance with a predetermined code, a write precompensation/driver, a head select circuit and the data transducer. In this aspect of the invention the write-mode channel further comprises zero insertion circuitry for selectively phase shifting a preamble field by inserting zeros into a stream of ones supplied to the preamble insertion multiplexer for a preamble field interval during data writing to disk, the zero insertion circuitry in accordance with the periodic ISI characteristic of the data transducer head.

In this other aspect of the invention the hard disk drive further includes a partial response, maximum likelihood class IV sampling data detection channel during a reading mode of the hard disk drive and includes in a serial data stream path from the data transducer head, a preamplifier, an analog filter/equalizer, a flash analog to digital converter, an adaptive digital finite impulse response filter, a Viterbi detector, a post-coder for post coding the serial data stream in accordance with the predetermined code, the ENDEC/SERDES for deserializing the coded serial data stream and for decoding the coded serial data stream into uncoded user data values and the sequencer. In this other aspect a digital timing loop is provided for clocking the flash analog to digital converter and is selectively connected to the series path for achieving phase lock to the phase shifted preamble field without manifesting a phase step during an interval between the preamble field and a following user data field.

As a related facet of this aspect of the invention the precoder precodes the serial data stream during writing mode in accordance with $1/(1 \oplus D^2)$ and the post coder post codes the serial data stream during sampling data detection in accordance with $(1 \oplus D^2)$.

As another related facet of this aspect of the invention the zero insertion circuitry comprises a decrementer which is repetitively loaded with a count related to a period of the periodic ISI characteristic of the data transducer head and which decrements to a rollover count marking a location of zero insertion for supplying zeros in lieu of ones to the preamble insertion multiplexer during writing of the preamble field.

As a further related facet of this aspect of the invention, the data transducer head comprises a thin film data transducer head which manifests ISI as periodic undershoots.

As one more related facet of this aspect of the invention the digital timing loop includes a timing multiplexer for selectively supplying to at least the digital timing loop either raw data samples from an output of the flash analog to digital converter during timing acquisition, or conditioned data samples from an output of the adaptive digital finite impulse response filter during a timing loop tracking mode.

As yet another related facet of this aspect of the invention, the digital timing loop is switched between high phase gain and high frequency gain coefficient settings during an initial interval of timing acquisition during a first portion of the preamble field, and low phase gain and low frequency gain coefficient settings during a subsequent portion of the preamble field which has been phase shifted to eliminate phase step at the interval between the preamble field and the following user data field. Similarly, the gain loop may be switched between high gain and low gain settings during gain acquisition and gain tracking modes.

In another facet of this aspect of the invention, the hard disk drive includes a partial response, maximum likelihood class IV sampling data detection channel during a reading mode of the hard disk drive and including in a serial data stream path from the data transducer head, a preamplifier, an analog filter/equalizer, a flash analog to digital converter, an adaptive digital finite impulse response filter, a Viterbi detector, a post-coder for post coding the serial data stream in accordance with the predetermined code, the ENDEC/SERDES for deserializing the coded serial data stream and for decoding the coded serial data stream into uncoded user data values and the sequencer, and a digital gain control circuit for controlling analog amplitude of the sampling data detection channel and being selectively connected to the series path for achieving gain amplitude control acquisition to the phase shifted preamble field without manifesting a channel gain amplitude step during an interval between the preamble field and a following user data field.

These and other objects, facets, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 1 is a highly diagrammatic and greatly enlarged view of a thin film magnetic head juxtaposed in proximity to moving magnetic storage media.

FIG. 2 is a graph of a sensed main magnetic flux transition bounded by two undershoots at e.g. −16T and +16T intervals from the main signal transition as induced in the thin film magnetic head of FIG. 1, for example.

FIG. 3 is a simplified block diagram of a prior art digital pole tip filter for reducing the effect of undershoot in user data streams.

FIG. 4 is a graph of groups of precoder digital signal input, write current values, and PR4 data samples across a time plane, illustrating injection of phase-flipping values at e.g. 32T intervals within e.g. a ¼T sine wave preamble to cancel the undesirable effects of undershoot-induced ISI shown in FIG. 2 in accordance with principles of the present invention.

FIG. 6 also includes a graph of several examples of gain amplitude control acquisition labeled "GAIN" and presented along the same time base horizontal axis as the phase graphs, and wherein gain values are provided along a right vertical line of the FIG. 6 graph.

DETAILED DESCRIPTION OF A PREFERRED EMBODIMENT

Figure 5:
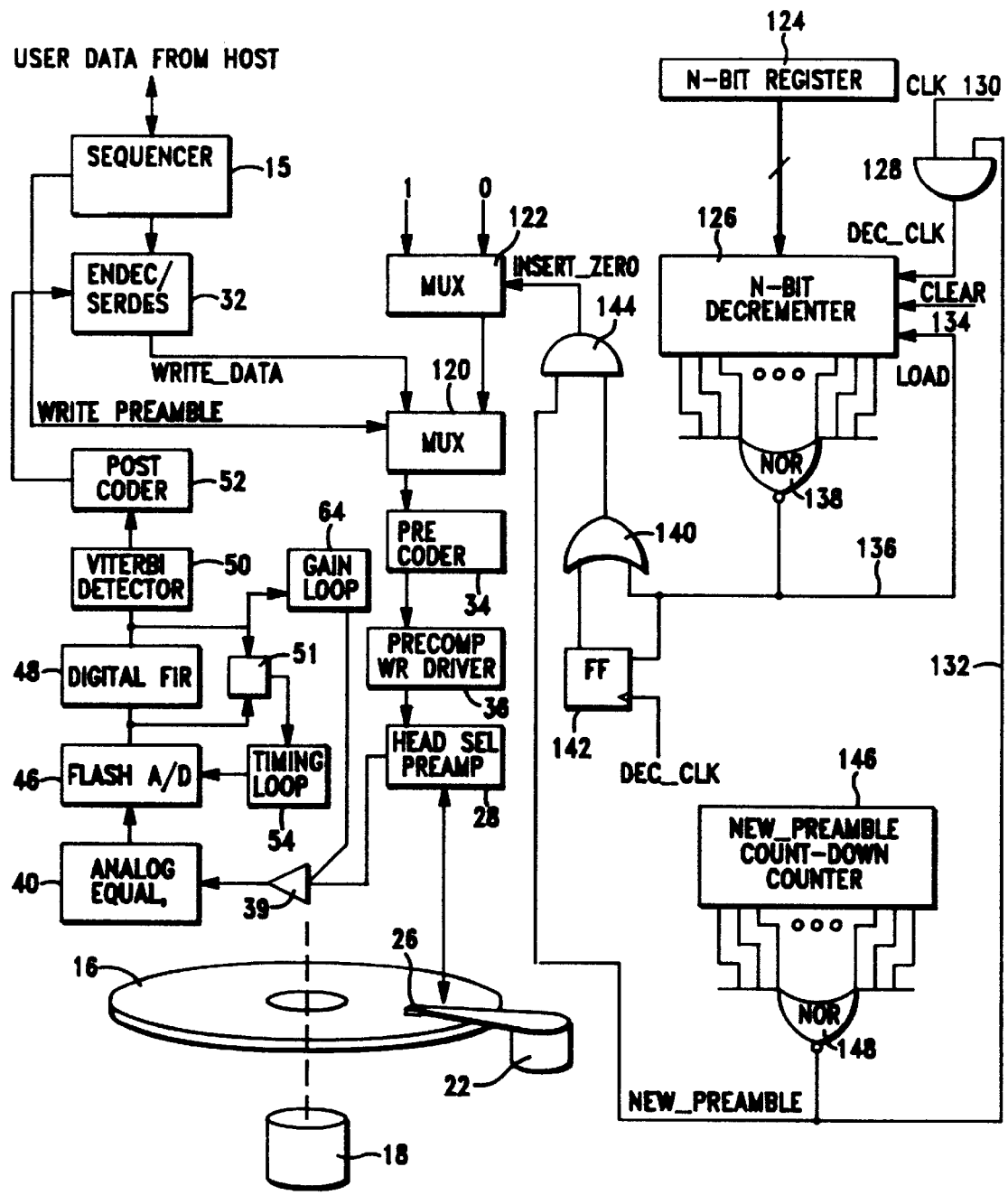
FIG. 5 is a block diagram of a disk drive PRML sampling data detection data channel which has been modified in accordance with principles of the present invention to achieve the modified ¼T preamble charted in FIG. 4.

FIG. 5 illustrates a PRML sampling data channel including a second order digital timing loop 54. The timing loop 54 receives raw or conditioned data samples from a multiplexer 51 and generates a timing clock which is used to clock a flash analog to digital converter (A/D) 46. An analog filter-equalizer 40 preconditions the analog waveform received from the thin film head 26 via a head select/preamplifier circuit 28 prior to quantization by the flash A/D 46. Unfiltered samples are then passed through an adaptive digital finite impulse response (FIR) filter 48 and then passed onto a Viterbi detector 50 which detects code groups in accordance with a predetermined trellis pattern. Code groups are then converted into code words by a post coder 52 and are then returned to user data bytes by an ENDEC/SERDES 32 before being passed into the sequencer 15. Details of these circuit elements are provided in the commonly assigned U.S. patent application Ser. No. 07/937,064 filed on Aug. 27, 1992 now U.S. Pat. No. 5,341,249 and entitled: "Disk Drive Using PRML Class IV Sampling Data Detection with Digital Adaptive Equalization", referenced above, and in commonly assigned U.S. Pat. No. 5,258,933 entitled: "Timing Control for PRML Class IV Sampling Data Detection Channel", the disclosure thereof being incorporated herein by reference.

The timing loop 54 phase locks the flash A/D 46 to incoming data transitions, as per the FIG. 2 sampling pattern. Phase lock occurs during each ¼T preamble pattern which is read by the thin film head 26, either following each embedded servo sector or at the beginning of each user data block. In conventional fashion the ¼T pattern is followed by a predetermined address mark pattern, and the pattern is used to lock the timing loop 54 to an accurate quantization phase. The address mark pattern is detected and then used to synchronize data and byte clocks generated in the sequencer 15, so that the ENDEC/SERDES 32 may recover the user data field pattern which follows the preamble and address mark. The playback response of the preamble pattern is also used to set initial gain in order to aid equalization of the signal stream to the nominal PR4 spectrum, such that when the data cell pattern leaves the adaptive FIR filter 48, a nominal ternary (i.e. three level) signal is present.

When enabled, a timing DAC within the loop 54 converts the scaled sample group error metric estimates $v_k$ into analog current values and applies those values to a timing summing junction which sums it with a non-read mode static starting reference value stored in the charge storage element of an analog loop filter function within the loop 54. In this manner, the error metric signal supplied by the DAC acts as a vernier control so as to adjust the held (but no longer updated) static reference value, in accordance with teachings explained in greater detail in commonly assigned U.S. Pat. No. 5,258,933, entitled: "Timing Control for PRML Class IV Sampling Data Detection Channel", the disclosure thereof being incorporated herein by reference.

Figure 6:
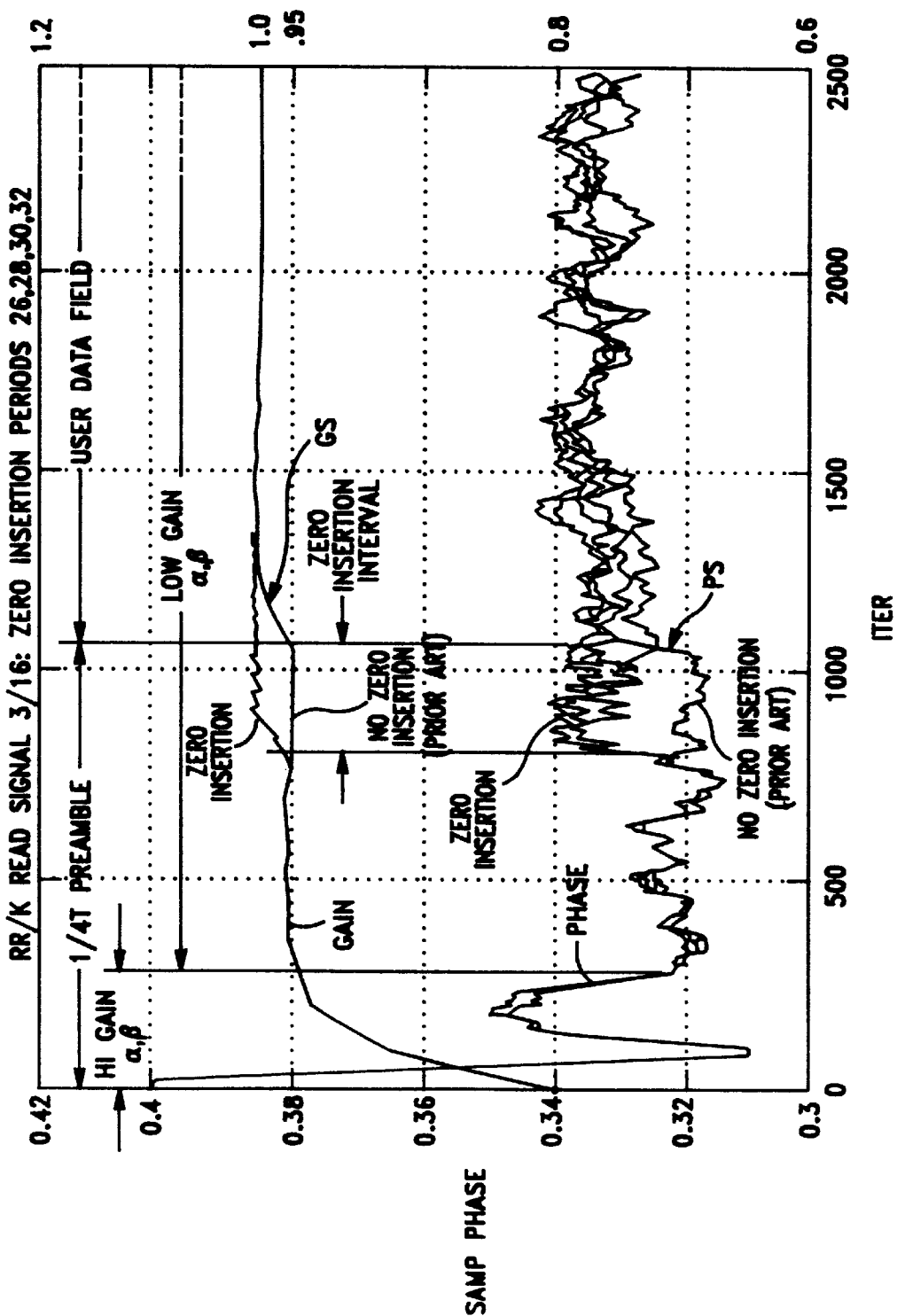
FIG. 6 is a graph of several examples of tiring loop phase acquisition labeled "PHASE" during the ¼T preamble field, with response from a conventional ¼T field showing a phase step PS juxtaposed with several examples of modified ¼T preamble fields in accordance with principles of the present invention and manifesting no appreciable timing phase step between preamble and user data fields. Phase shift values appear along a left side vertical axis of the FIG. 6 graph.

Timing acquisition has two modes: a high gain mode when phase gain ($\alpha$) and frequency gain ($\beta$) coefficients are high, and a low gain mode when these coefficients are at a lower level. As shown in FIG. 6, when the preamble field is reached during data playback, the timing mode is initially in a high gain timing acquisition mode. This mode continues for a predetermined interval which is part of the way through the preamble field. Once the predetermined high gain mode interval has passed, a multiplexer 51 switches the input of the digital timing error extraction circuit 54 from the raw samples $\{x_k\}$ from the flash A/D converter 46 to conditioned samples $\{y_k\}$ put out from the adaptive digital FIR filter 48.

An error metric $z_k$ put out from the timing error extraction function within the timing loop 54 is filtered to provide a resultant low pass filtered error metric, described by the relation $\alpha z_k + \Delta_k$. This error metric is then rate scaled to yield sample group error metric estimates $v_k$ at e.g. one half of the initial error metric clocking rate. By using a one half rate for the error metric being fed to a digital to analog converter (DAC) function within the loop 54, and by clocking the timing DAC at a ½ ADCLK rate, improvements in power consumption and noise immunity are realized at the digital to analog interface. Basically, two successive error metric samples are averaged, and the average is put out. The overhead attributable to the process within the update rate scaler function amounts only to one additional clock cycle of latency at the sample rate, which does not significantly degrade timing loop convergence.

The high gain acquisition mode timing error estimate is described by the following:

$$z_k^a = -x_k \hat{x}_{k-1} + x_{k-1} \hat{x}_k \qquad (1)$$

Within the timing error extraction function, the following relation is obtained:

$$\hat{x}_k = \text{signum}(x_k - \eta_k) \qquad (2)$$

where signum $(x) = +1$ for $x \geq 0$ and $-1$ for $x<0$, and $$\eta_k = E \cdot \hat{x}_{k-2}, \qquad (3)$$

where E is a programmable constant.
The digital low pass filter function generates the following:

$$\Delta_{k+1} = \Delta_k + \beta z_k \qquad (4)$$

The phase gain scaling function $\alpha$ in acquisition mode is defined by the following:

$$\alpha^a = 2^{-n1} + 2^{-n2} \qquad (5)$$

where n1 lies between 0 and 7 and n2 lies between 1 and 8. The frequency gain scaling function $\beta$ in acquisition mode is defined by the following:

$$\beta^a = 2^{-m1} + 2^{-m2} \qquad (6)$$

where m1 lies between 1 and 8, and m2 lies between 2 and 9.

The update rate scaler function provides the sample group error metric estimates $v_k$ in accordance with the following function:

$$v_k = \tfrac{1}{2}[(\alpha z_k + \Delta_k) + (\alpha z_{k-1} + \Delta_{k-1})] \quad (7)$$

for even timing samples and $$v_k = v_{k-1} \quad (8)$$

for odd timing samples, thereby halving the clocking rate for the error metric being supplied to the timing DAC.

The low gain timing tracking mode timing error estimate is described by the following:

$$z_k^t = -y_k \hat{y}_{k-1} + y_{k-1} \hat{y}_k \quad (9)$$

Within the timing error extraction function, the following relation is obtained:

$\hat{y}k = 1$ if $yk > THP$;

$0$ if $-THP \leq yk \leq THP$;

and $-1$ if $yk < -THP$ \quad (10)

where THP is a programmable threshold.
The digital low pass filter function provided by equation (4) above generates the same function during tracking as during acquisition, with the exception that $z_k^t$ of equation (9) is used in place of $z_k^a$ of equation (1). The phase gain scaling function $\alpha$ in low gain tracking mode is defined by the following:

$$\alpha^t = 2^{-n3} + 2^{-n4} \quad (11)$$

where n3 lies between 0 and 7 and n4 lies between 1 and 8. The frequency gain scaling function $\beta$ in low gain tracking mode is defined by the following:

$$\beta^t = 2^{-m3} + 2^{-m4} \quad (12)$$

where m3 lies between 1 and 8, and m4 lies between 2 and 9.

The update rate scaler function similarly provides the sample group error metric estimates $v_k$ during tracking mode in accordance with the same function (6) as is employed during acquisition mode, with the above terms changed accordingly for tracking. The tracking values result in a narrower bandwidth timing loop, with superior signal to noise ratio during tracking mode, thereby providing increased stability and robustness during data tracking and read back operations of the FIG. 5 disk drive 10.

However, unless corrected by principles of the present invention, the timing loop described above yields an undesirable phase step PS illustrated in FIG. 6 and discussed above. This phase step is indicative of phase lock error in the timing loop directly attributable to the effects of undershoot in the recovered, unmodified preamble.

Returning to FIG. 5, the PRML sampling digital data channel also includes e.g. a first order gain control loop circuit 64. The gain loop 64 receives conditioned data samples from the output of the digital FIR filter 48 and develops a gain error metric which is converted from digital to analog and applied to control a VGA 39 at an analog front end of the sampling digital data channel. Further details of an exemplary gain loop 64 and associated circuitry and functions are to be found in commonly assigned, copending U.S. patent application Ser. No. 07/936,742 now U.S. Pat. No. 5,375,145 filed on Aug. 27, 1992 and entitled: Multi-Mode Gain Control Loop for PRML Class IV Sampling Data Detection Channel", the disclosure thereof being incorporated herein by reference.

As explained above, unless corrected, coherent ISI, such as undershoot-induced ISI, can add to the read back of the periodic ¼T preamble pattern as shown in FIG. 2. The ISI may cause apparent amplitude of the preamble sine wave peaks to be higher (or lower) than they really are, leading to erroneous channel gain, This phenomenon is also illustrated in FIG. 6 in the graph labeled "GAIN". In this graph, gain amplitude is marked along the right vertical edge. When no zeros are inserted into the preamble, an undesired gain step GS, e.g. of about 0.95 gain to 1.0 gain, occurs at a beginning region of random user data. However, when zeros are inserted into the data stream during the encoding process in accordance with principles of the present invention described below, the gain control rises during the zero-insertion portion of the ¼T preamble field and dithers slightly about nominal, e.g. 1.0, gain control. This dither then ceases once random data patterns are encountered at the beginning of the user data field.

Figure 7:
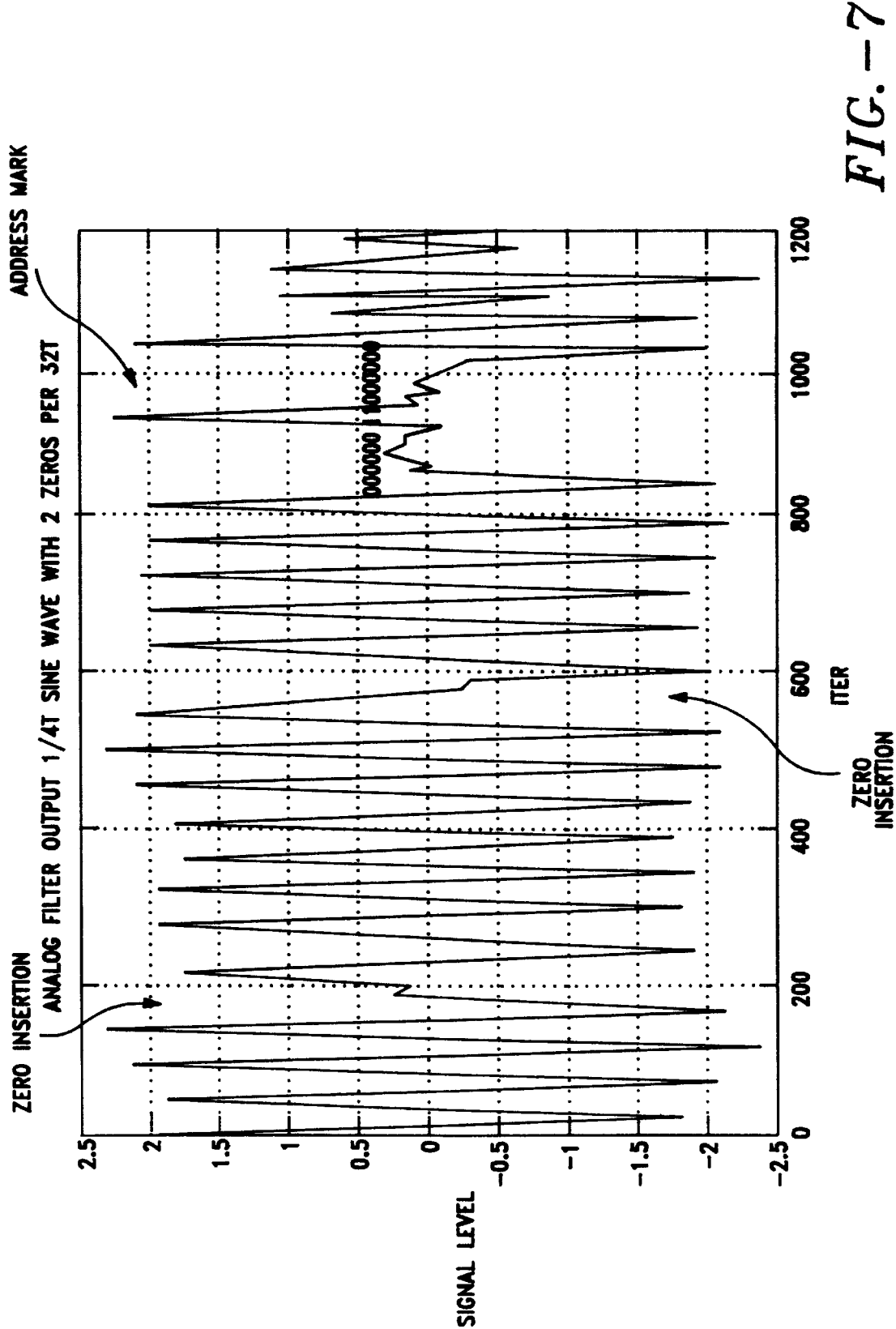
FIG. 7 is a graph of an equalized analog ¼T preamble signal amplitude versus time and showing phase flipping resulting from zero insertion during preamble writing in accordance with principles of the present invention.

With reference now to FIG. 4, depending upon the location (intervals) of the undershoots from the thin film head 26, e.g. two zeros are inserted into the preamble field, and these zeros have the effect of reversing the phase of groups of the PR4 preamble sine wave by 180 degrees, as shown in FIG. 7. The effect of zero insertion of the type graphed in FIG. 4 may be seen in FIG. 6 within an increment of the preamble preceding the user data field and the conventional phase step PS. When zeros are inserted into the preamble pattern during writing thereof, the synchronous data channel manifests no significant phase step PS or gain step GS when transitioning from preamble to user data. Rather, as shown in FIG. 6, the timing phase as well as the gain control tend to dither slightly about nominal phase and gain values during the zero insertion interval, and then tend to track the random user data of the data pattern without any steps.

The FIG. 6 data also shows that the zero insertion method of the present invention is robustly effective over a range of zero insertion periods. Periods of 26T, 28T, 30T, and 32T result in timing phase traces in FIG. 6 which dither slightly about a nominal phase of random user data at the beginning of the user data field, and none of these timing periods for zero insertion results in a significant timing phase step PS present with the unmodified preamble pattern.

It should be noted that FIG. 6 is highly diagrammatic, in that it illustrates a high gain region when phase and frequency gain values ($\alpha$ & $\beta$) as well as channel amplitude gain values ($\mu$) are set to a high level to bring about rapid approximate convergence to nominal. In FIG. 6, immediately following the high gain portion of both phase and gain graphs, a region of low gain without zero insertion is shown. This region is presented to show the tendency of the phase PLL timing loop 54 and the gain control loop 64 to converge to erroneous phase and gain values, with a resultant undesired phase step PS and gain step GS occurring when user data is encountered. In FIG. 6, a zero insertion region is shown to be imposed over about the last one third of the low gain portion of the ¼T preamble field, in order to illustrate the salutary effect of zero insertion in accordance with the present invention upon both phase and gain in eliminating the phase step PS and the gain step GS at the beginning of user data. In practice, the zero insertion region begins at the beginning of the low gain portion of the ¼T preamble field, and there is no reason or need to delay zero insertion, thereby reducing the length of the preamble field over the length shown in FIG. 6.

The present inventor has determined that it takes about two successive (e.g. 32T) periods of zero insertion for the timing and gain loops to settle from the step amplitude shown in FIG. 6 and to dither about the nominal timing phase and gain control level, also as shown in FIG. 6. The settle period is also dependent upon the particular digital channel design.

Returning now to FIG. 5, one example of zero insertion circuitry is shown as some additional hardware logic elements within the write mode portion of the digital channel otherwise described in commonly assigned U.S. patent application Ser. No. 07/937,064 now U.S. Pat. No. 5,341,249 filed on Aug. 27, 1992 and entitled: "Disk Drive Using PRML Class IV Sampling Data Detection with Digital Adaptive Equalization", referenced above. In this particular example, a zero insertion multiplexer 120 is inserted into the serial data path leading from the ENDEC/SERDES 32 to the $1/(1 \oplus D^2)$ precoder 34. The multiplexer 120 selects WRITE_DATA during writing of the user data field, and selects an output of ones and inserted zeros provided by a second multiplexer 122 during writing of the preamble field. The rest of the new circuitry appearing on FIG. 5 relates to controlling the multiplexer 122.

An N-bit register 124 provides a predetermined count, such as 32, which is selected to be related to the period between undershoots, see e.g. FIG. 2. In turn, this period is related to the pole width characteristics of the particular e.g. thin film head 26 and is specified/measured as a part of disk drive design. The value loaded into the N-bit register 124 may be loaded by a disk drive microcontroller (not shown) during disk drive initialization, for example. Different numbers may be selected and used for different heads 26 during writing of preamble patterns, if there is a wide variance in pole width characteristics from head to head within the disk drive, thereby facilitating use of less expensive heads in a disk drive employing a PRML sampling data detection channel.

An N-bit decrementer 126 receives the predetermined count value from the N-bit register 124 in response to a load signal on a path 136. An AND gate 128 combines a data cell clock signal at the "T cell" clocking rate on a path 130 and a NEW_PREAMBLE signal on a path 132 to provide a DEC_CLK signal for decrementing the N-bit decrementer 126. A clear signal on a path 134 is used to clear out the count held in the N-bit decrementer as part of a reset sequence. Parallel bit position outputs from the N-bit decrementer 126 feed into a NOR gate 138 which determines when the N-bit decrementer 126 has reached a zero count. When it has, a true signal is asserted by the NOR gate 138 onto the path 136 which causes the N-bit decrementer 126 to reload the count value held in the N-bit register 124. Simultaneously, the true signal passes through an OR gate 140 and, during NEW-PREAMBLE time passes through a gate 144 to toggle the zero insertion multiplexer 122. This true signal therefore represents a first zero of a two-zero pair which is thereby inserted into the preamble signal stream.

A second zero is also added by virtue of a flip-flop 142 which is toggled by the true signal and clocked by the DEC_CLK signal on the path leading from the clock AND gate 128. Accordingly, the flip-flop 142 adds a second zero following the first, by having its true output asserted through the OR gate 140 and the AND gate 144 so as to maintain the zero insertion multiplexer 122 in its toggled or zero-insertion mode for inserting the second zero.

A new preamble count-down counting circuit 146 (which may be included within the circuitry of the data sequencer 15) and NOR gate 148 are provided to generate and assert a NEW_PREAMBLE window which begins when the timing loop switches from high gain mode to low gain mode and continues until the user data field is reached. This NEW_PREAMBLE window is asserted on the path 132 to enable the DEC_CLK AND gate 128 and marks in time an interval of zero pair insertions in accordance with principles of the present invention.

While the present invention has been explained in reference to undershoot phenomena stemming "from e.g. thin film" magnetic data transducer head structures, it will be readily apparent to those skilled in the art that any magnetic head structure which manifests predictable uncancelled ISI characteristics in response to periodic constant frequency bursts will benefit from application of the principles of the present invention.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A hard disk drive including a rotating data storage disk, a data transducer head for writing data to the disk and reading data from the disk and manifesting a measurable periodic undershoot characteristic, a sequencer for sequencing user data blocks to and from the data storage surface, and a digital write-mode channel for writing a partial response class IV signal to the disk and comprising in series interconnection during a writing mode of the hard disk drive: the sequencer, an ENDEC/SERDES for encoding the data and for serializing encoded data into a serial data stream, a preamble insertion multiplexer for inserting a stream of preamble-producing data values into the serial data stream in lieu of serial data from the ENDEC/SERDES, a precoder for preceding the serial data stream in accordance with a predetermined code, a write precompensation/driver, a head select circuit and the data transducer, the write mode channel further comprising zero insertion circuitry for selectively phase shifting a preamble field by inserting zeros into a stream of ones supplied to the preamble insertion multiplexer for a preamble field interval during data writing to disk, the zero insertion circuitry in accordance with the periodic undershoot characteristic of the data transducer head.

2. The hard disk drive set forth in claim 1 which further includes a partial response, maximum likelihood class IV sampling data detection channel during a reading mode of the hard disk drive and including in a serial data stream path from the data transducer head, a preamplifier, an analog filter/equalizer, a flash analog to digital converter, an adaptive digital finite impulse response filter, a Viterbi detector, a post-coder for post coding the serial data stream in accordance with the predetermined code, the ENDEC/SERDES for deserializing the coded serial data stream and for decoding the coded serial data stream into uncoded user data values and the sequencer.

3. The hard disk drive set forth in claim 2 wherein the precoder precodes the serial data stream during writing mode in accordance with $1/(1 \oplus D^2)$ and wherein the post coder post codes the serial data stream during sampling data detection in accordance with $(1 \oplus D^2)$.

4. The hard disk drive set forth in claim 2 wherein the digital timing loop includes a timing multiplexer for selectively supplying to the digital timing loop one of raw data samples from an output of the flash analog to digital converter and conditioned data samples from an output of the adaptive digital finite impulse response filter.

5. The hard disk drive set forth in claim 2 further comprising means within the digital timing loop for switching between high phase gain and high frequency gain coefficients during an initial interval of timing acquisition during a first portion of the preamble field, and low phase gain and low frequency gain coefficients during a subsequent portion of the preamble field which has been phase shifted to eliminate phase step at the interval between the preamble field and the following user data field.

6. The hard disk drive set forth in claim 1 which further includes a partial response, maximum likelihood class IV sampling data detection channel during a reading mode of the hard disk drive and including in a serial data stream path from the data transducer head, a preamplifier, an analog filter/equalizer, a flash analog to digital converter, an adaptive digital finite impulse response filter, a Viterbi detector, a post-coder for post coding the serial data stream in accordance with the predetermined code, the ENDEC/SERDES for deserializing the coded serial data stream and for decoding the coded serial data stream into uncoded user data values and the sequencer.

7. The hard disk drive set forth in claim 6 wherein the precoder precodes the serial data stream during writing mode in accordance with $1/(1 \oplus D^2)$ and wherein the post coder post codes the serial data stream during sampling data detection in accordance with $(1 \oplus D^2)$.

8. The hard disk drive set forth in claim 6 wherein the digital gain control circuit receives conditioned data samples from an output of the adaptive digital finite impulse response filter.

9. The hard disk drive set forth in claim 6 further comprising means within the digital gain control circuit for switching between a high channel amplitude gain coefficient during an initial interval of timing acquisition during a first portion of the preamble field, and low channel amplitude gain coefficient during a subsequent portion of the preamble field which has been phase shifted to eliminate phase step at the interval between the preamble field and the following user data field.

10. The hard disk drive set forth in claim 6 wherein the partial response, maximum likelihood class IV sampling data detection channel further comprises variable gain amplifier means connected between the preamplifier and the analog filter/equalizer, and wherein the digital gain control circuit generates and puts out a digital gain error metric which is converted to analog and applied to control the variable gain amplifier means.

11. The hard disk drive set forth in claim 1 wherein the zero insertion circuitry comprises a decrementer repetitively loaded with a count related to a period of the periodic undershoot characteristic of the data transducer head for decrementing to a rollover count value marking a location of zero insertion for supplying zeros in lieu of ones to the preamble insertion multiplexer during writing of the preamble field.

12. The hard disk drive set forth in claim 1 wherein the data transducer head comprises a thin film data transducer head.

* * * * *